United States Patent [19]

Hewson

[11] Patent Number: 4,717,031
[45] Date of Patent: Jan. 5, 1988

[54] FERMENTATION VESSEL
[75] Inventor: C. Bruce Hewson, Horseshooe Bay, Canada
[73] Assignee: Brewmaster Systems Ltd., Canada
[21] Appl. No.: 856,742
[22] Filed: Apr. 28, 1986
[51] Int. Cl.⁴ .............................................. B65D 1/06
[52] U.S. Cl. .................................... 215/1 C; 215/32; 150/55; 220/367
[58] Field of Search ............... 220/367, 374; 215/1 C, 215/32; 150/55

[56] References Cited

U.S. PATENT DOCUMENTS

| | | | |
|---|---|---|---|
| 4,055,282 | 10/1977 | Komendowski | 222/421 |
| 4,113,129 | 9/1978 | Cambio, Jr. | 215/1 C |
| 4,176,755 | 12/1979 | Winchell | 215/32 |
| 4,378,891 | 4/1983 | Fowles et al. | 215/32 |
| 4,478,342 | 10/1984 | Slater et al. | 215/32 |
| 4,579,260 | 4/1986 | Young et al. | 215/1 C |

Primary Examiner—George T. Hall
Attorney, Agent, or Firm—Rogers, Bereskin & Parr

[57] ABSTRACT

A fermentation vessel is molded in one piece and comprises a container and a closure member. The container includes a neck portion. The closure member includes an air lock and a connection portion extending from the neck portion. In use, the connection portion is removed and discarded, to enable the closure member to be fitted around the neck portion. The vessel is made by a blow molding method.

18 Claims, 7 Drawing Figures

FERMENTATION VESSEL

FIELD OF THE INVENTION

This invention relates to a fermentation vessel. This invention more particularly relates to a fermentation vessel, which is molded in plastic and is intended for domestic use.

BACKGROUND OF THE INVENTION

At the present time, there is an increasing interest in home brewing. Many people are brewing a variety of alcoholic beverages, such as beer and wine, in their own homes. However, successful brewing requires proper equipment, which must be kept extremely clean. During the actual fermentation process, it is necessary to contain the liquid in a clean environment, whilst excluding the surrounding air. At the present time, this is typically achieved by providing a glass vessel that is closed with a rubber bung. The bung includes an aperture, in which an air lock is fitted. The air lock includes a U-shape duct, which is filled with water, to form the air lock.

Such an arrangement has numerous disadvantages. It requires the assembly of a number of separate components. Consequently, each component has to be manufactured separately. Also, as the bung and air lock are separate, for the user they represent separate items which have to be cleaned, stored etc.

A further disadvantage of known domestic brewing techniques is that they require the liquid to be fermented in a first vessel, and then transferred to a second vessel. One reason for this is to separate sediment generated during the initial fermentation. Then, a second fermentation is carried out in the second vessel. Frequently, it is then necessary to transfer the fermented liquid from the second vessel into bottles. It is to be appreciated that this requires numerous individual steps, all of which must be carried out with carefully cleaned equipment, to prevent growth of unwanted organisms etc. Also, conventionally much of the equipment used is in the form of simple containers, without taps etc. As a result, the transference of liquid from one vessel to another has to be carried out by siphoning the liquid from one vessel to the other.

SUMMARY OF THE INVENTION

Accordingly, it is desirable to provide a fermentation vessel, which is capable of simple and economical manufacture. The fermentation vessel should incorporate as few components as possible, to facilitate both manufacture and use. Further, the fermentation vessel should be suitable for a single stage fermentation, in the one vessel. It should also facilitate the transferring of the fermented liquid from the vessel.

In accordance with the present invention, there is provided a unitary, molded fermentation vessel comprising: a container for receiving liquid, and including and a neck portion at its upper end; and a closure member, which includes an air lock means and a connection portion, and which is removable in use, the closure member being adapted, in use, after separation from the connection portion, for forming a seal with the neck portion.

Thus, in accordance with the pressure invention, it is envisaged that a closure member including an air lock is molded simultaneously with the container itself. To enable the closure member to be fitted onto the neck portion, a connection portion is removed from the closure member. In a preferred embodiment, one of the neck portion and the closure member is provided with an O-ring seal, which engages a correspondingly machined seat of the other of the closure member and the neck portion.

The present invention thus also provides a fermentation vessel having two principal components, namely a container and a closure member, which have been molded together and then separated. The closure member includes the air lock. Thus, these two components, together with an O-ring seal if required, form a complete fermentation vessel.

In accordance with another aspect of the present invention, there is provided a method for forming a fermentation vessel as defined above, the method comprising the steps of:

(i) blow molding the fermentation vessel in one piece in a mold;

(ii) removing the fermentation vessel from the mold;

(iii) separating the closure member from the container;

(iv) removing the connection portion from the closure member.

The fermentation vessel advantageously includes other features, to facilitate its use as a single stage fermentation vessel. Thus, it can include an outlet tap, mounted in a socket near the base of the container. This outlet tap can be connected by a flexible pipe to a float within the container. This enables the outlet tap always to draw off fluid from near the top of fluid within the container. This should assist in preventing sediment from being drawn off accidentally. Further, it is preferred for the base of the container to be shaped, to both facilitate collection of sediment and to withstand pressure. For this purpose, the base can have two coplanar flat parts for supporting the container, and a curved surface extending from one side of the container to the other between the flat parts. For a blow molded container, the interior of the container will have a similar profile to the exterior. Sediment should then preferentially settle on the flat parts, rather than the raised parts of the curved surface. Also, it has been found that the provision of such a curved surface restrains the base, if the container is pressurized to low pressures, i.e. pressures less than one atmosphere above atmospheric pressure. A common problem with flat bottomed containers is that they bulge outwards under pressure, possibly making the container unstable. It has been found that this curved surface prevents this bulging effect under such moderate pressures.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention, and in which.

Figure 1:
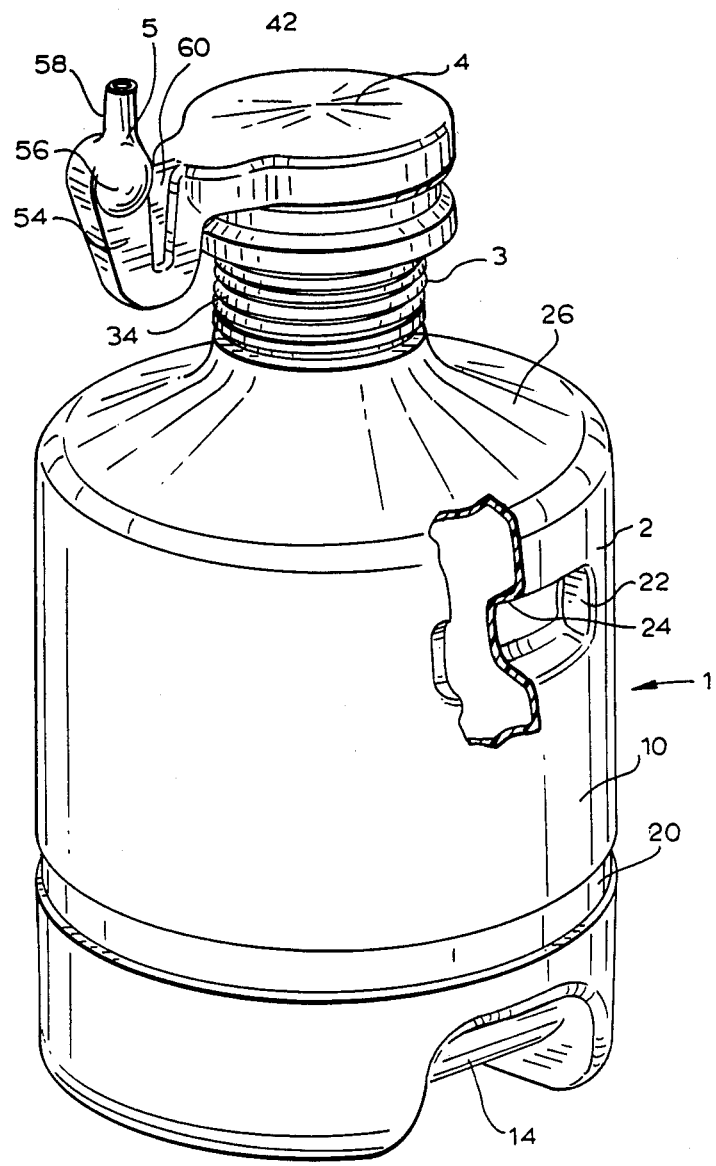
FIG. 1 shows a perspective view from above of a unitary fermentation vessel.

Referring first to FIG. 1, there is shown a fermentation vessel, generally denoted by the reference 1. The fermentation vessel 1 comprises a container 2, which includes a neck portion 3. The fermentation vessel also has a closure member 4, which includes an air lock 5 and a connection portion 6 (see FIG. 2).

The container 2 has a generally cylindrical outer wall 10. At its base, the container 2 includes two flat portions 11, 12 (see FIG. 5) for supporting the fermentation vessel 1. Between the flat portions 11, 12, there extends a curved portion 14, of generally uniform width. As indicated in the drawings, the various portions 11, 12 and 14, and the outer cylindrical side wall 10 blend smoothly into one another.

Adjacent the base of the container 2, there is a socket 16 for a tap 18. The socket 16 has a raised boss, which has a vertical surface, and a threaded socket for the tap 18.

Part way up the container 2, there is a shallow annular recess 20. As detailed below, this is for receiving a heating element.

Adjacent the top of the cylindrical outer wall 10, there are two generally rectangular recesses 22, which are diametrically opposite one another, above the ends of the curved portion 14. Each recess 22 is generally rectangular, and defines a gripping surface 24, by which the vessel 1 can be lifted.

Figure 2:
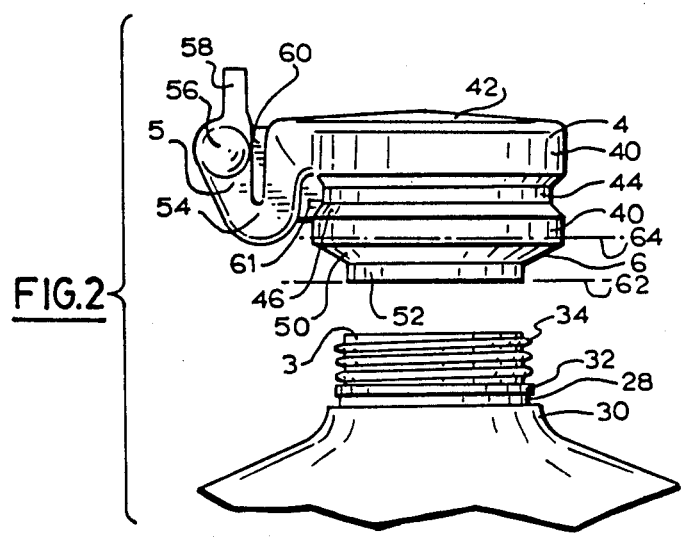
FIG. 2 is an elevational view of the upper part of the fermentation vessel of FIG. 1, with a closure member removed.

The neck portion 3 is connected to the cylindrical outer wall 10 by a conical surface 26, in known manner. The neck portion 3 is generally cylindrical, and is best seen in FIG. 2. The neck portion 3 includes an outwardly facing annular groove 28. The groove 28 is formed between an upper shoulder 30 of the conical surface 26, forming a flat surface, and an outwardly extending annular lip 32. The lip 32 does not extend out as far as the shoulder 30.

Above the annular groove 28 and lip 32, there is a screw thread 34. Here, the thread 34 is a buttress thread. In known manner, the thread 34 is formed on a cylindrical part of the neck portion 3. The outside diameter of the screw thread 34 corresponds to that of the lip 32.

Figure 3:
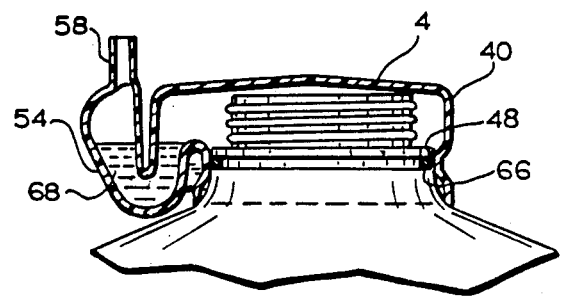
FIG. 3 is an elevational view of the upper part of the fermentation vessel of FIGS. 1 and 2, in partial section, with a detached closure member.
Figure 4:
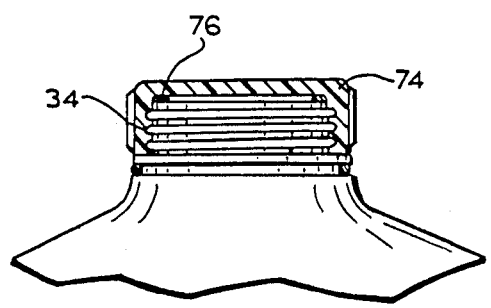
FIG. 4 is an elevational view of the upper part of the fermentation vessel, in partial section, showing a closure cap.

The closure member 4 has a generally cylindrical body portion 40, which is closed at the top by a shallow, conical top surface 42. A part 44 of the body portion 40 is also cylindrical, but of smaller diameter, so as to be radially inset from the main part of the cylindrical body portion 40. This part 44 is joined to adjacent parts of the body portion 40 by frustro-conical sections 46. As shown in FIG. 3, the part 44 then defines a generally cylindrical closure surface 48, on its inside.

The body portion 40 is continuous with the connection portion 6. The connection portion 6 comprises an upper frustro-conical part 50 and a short cylindrical part 52. The cylindrical part 52 is continuous with the neck portion 3 and is of the same diameter.

Extending out from one side of the cylindrical body portion 40 is the air lock 5. The air lock 5 is a generally U-shape duct 54. The duct 54 has a generally rectangular cross-section along most of its length. One end of the duct 54 opens into the body portion 40. The other end of the duct 54 includes an enlarged part 56, which is part-spherical on either side. This enlarged part 56 continues into a narrow, cylindrical end part 58. Web sections 60, 61 extend between the two limbs of the U-shape duct 54 and between the duct 54 and the body portion 40.

The fermentation vessel 1 is formed by blow molding, in known manner. The vessel 1 is formed in a single mold, with a dividing plane of the mold extending vertically through the vessel 1 and through the air lock 5 and socket 16. A threaded insert is provided for the socket 16. The vessel 1 is dimensioned, to enable it to be used for brewing five gallons (imperial) of liquid. In this case, the wall thickness of the vessel 1 will be in the range 90–180 thousandths of an inch. As is known for blow molding, the wall thickness will vary. Also, blow molding will result in a continuous surface. Thus, the end of the cylindrical portion 58 of the air lock 5 will be closed, as indicated at 60. The vessel 1 can be molded in any suitable plastics material, such as polyethylene or polypropylene. Further, the plastic can be transparent, translucent or coloured, as detailed below.

FIG. 1 shows the fermentation vessel 1, as blow-molded in one piece. To finish the vessel 1, the closure member 4 is separated from the container 2. They are separated along a plane indicated by the dotted line 62 in FIG. 2. Then, the connection portion 6 of the closure member 4 has to be removed and discarded. The closure member 4 and connection portion 6 are correspondingly separated along a plane indicated by the dotted line 64 in FIG. 2. Also, the closed end 60 of the air lock 5 is cut off and discarded, to leave the duct 54 open at one end.

The closure member 4 has to form a good seal with the container 2. Consequently, after separation of the closure member 4, the closure surface 48 is machined to form an accurate cylindrical closure surface; the blow molding process does not result in a sufficiently accurate surface. Then, an O-ring 66 is fitted into the annular groove 28, as shown in FIG. 3. The closure member 4 can then be slid down over the neck portion 3, until the closure surface 48 contacts the O-ring 66. The frustro-conical parts 46 enable the closure surface 48 to engage the O-ring 66 smoothly. Then, as shown in FIG. 3, the closure member 4 rests on the container 2, so that the interior of the container is only open to the atmosphere via the air lock 5.

For the socket 16, the profile of the socket and a screw thread are formed by the molding operation. However, again the base of the socket will be closed by the material of the container. Thus, this is cut or drilled away, to open the socket 16. The tap 18 can then be fitted.

The fermentation vessel 1 is then ready for use, and this is described below.

In use, with the tap 18 and O-ring 66 fitted to the container 2, the user has essentially two components to handle, namely the container 2 and closure member 4. To brew beer or wine, the necessary ingredients are prepared, and the container 2 is filled with them. The air lock 5 is then filled with a suitable amount of water for forming an air lock, as shown in FIG. 3, and indicated at 68. The closure member 4 is then placed on the container 2, with a seal being formed between it and the O-ring 66. The vessel 1 can then be left at a suitable location, whilst the fermentation proceeds. Gases given off by fermentation are discharged through the air lock 5, in known manner.

Figure 5:
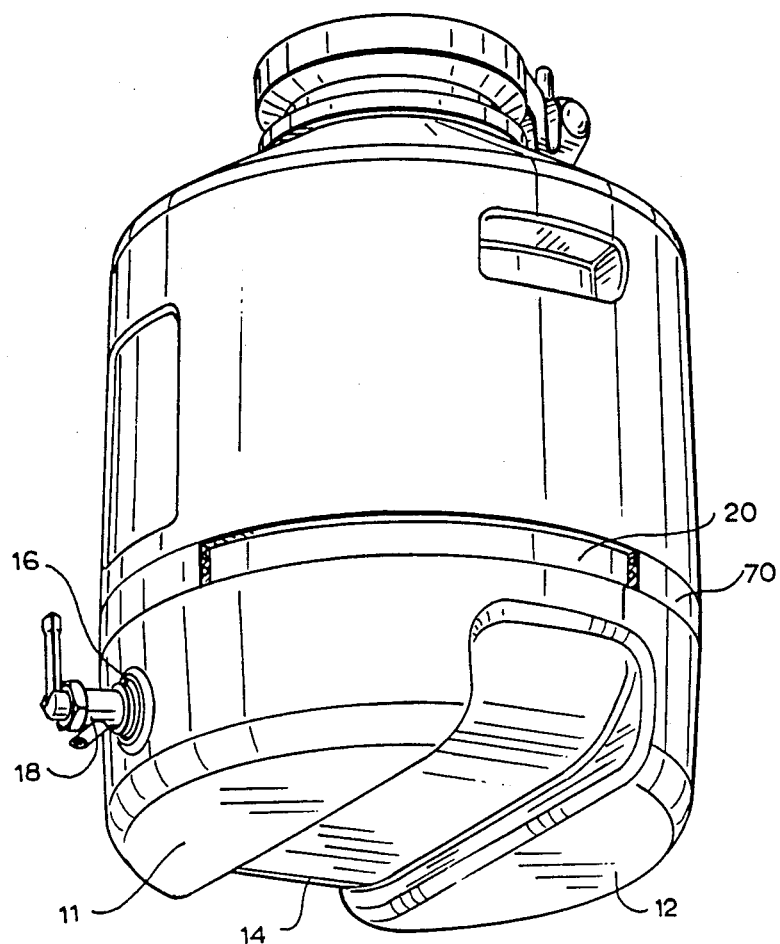
FIG. 5 is a perspective view from below of a fermentation vessel with detached closure member.
Figure 7:
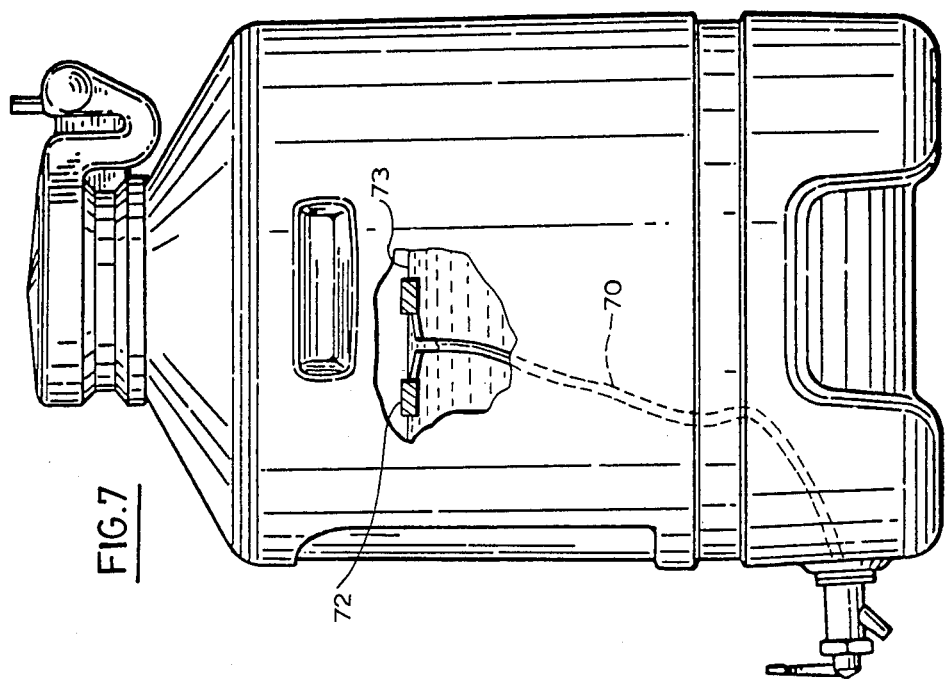
FIGS. 6 and 7 are elevational views of the fermentation vessel of FIG. 5, with FIG. 7 being partly in section.

If required, to maintain the liquid in the vessel 1 at a suitable temperature, an elongate heating element can be placed around the container 2. Such a heating element is shown in FIG. 5 and denoted by the reference 70. It is located in the annular recess 20. The heating element 70 is an electrical resistance heater, and encircles the container 2, as a belt. The annular recess 20 ensures that the heating element 70 is secured in position, and will not slide off the container 2.

Once the fermentation is complete, unlike known systems, there is no need to siphon the liquid to a secondary container etc. The profile of the base is such as to assist in the collection of sediment, so that it does not contaminate liquid drawn off from the container 2. The user can then draw off liquid through the tap 18, as required.

Figure 6:
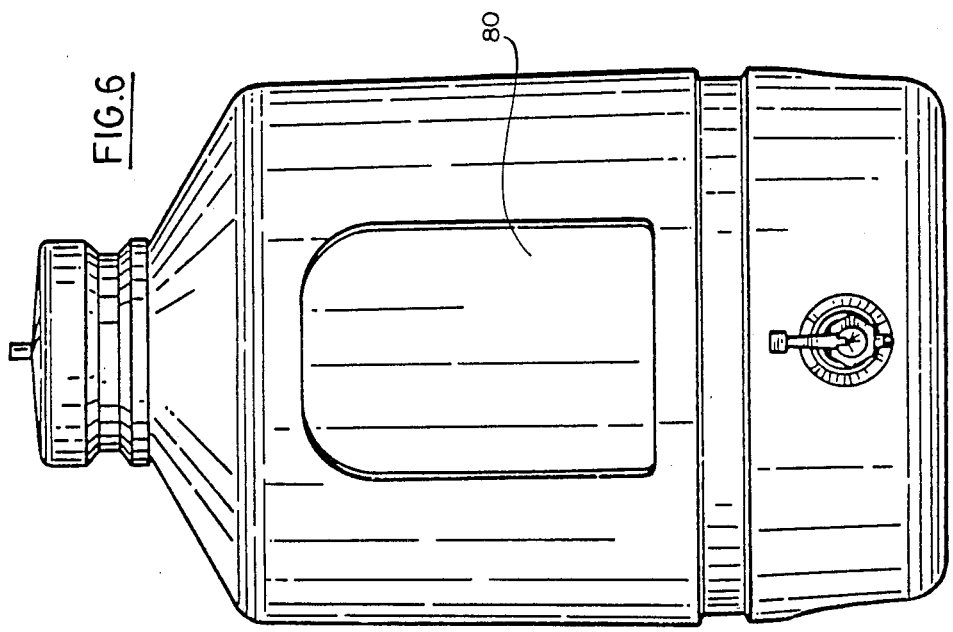

To further assist in preventing contamination of the finished product by sediment etc., the tap 18 can be arranged to draw off liquid from near the upper end of the container 2. Such an arrangement is shown in FIG. 6. A flexible pipe 70 is connected at one end to the tap 18, and at the other end to a float 72. Thus, the free end of the pipe 70 is always held near the liquid surface 73. This enables liquid to be drawn off through the tap 18, which does not include any sediment, which has fallen towards the bottom of the container 2.

Once fermentation is complete, the closure member 4 can be left in position. The air lock 5 would then still operate as an air lock, but in reverse. Thus, when liquid is drawn off from the container 2, air would pass through the air lock 5 into the container, to replace removed liquid. The water in the air lock 5 however would still maintain a seal. However, for some beverages, it may be desirable to replace the closure member 4 with a cap. This is shown in FIG. 5. The cap is denoted by the reference 74, and includes a thread engaging the screw thread 34. The cap 74 includes ribs for gripping it. It also includes a resilient planar gasket 76. Where a cap 74 is to be used, then the top of the neck portion 3 is machined, after the closure member 4 is cut away. This provides a smooth surface on the neck portion 3, suitable for mating with the gasket 76. The screw cap 74 can then provide a good seal for beer, wine etc. in the container 2.

For some beverages, it is desirable to pressurize the finished product with carbon dioxide. For this purpose, the vessel 1 can be fitted with a screw cap, comparable to the cap 74, but including an inlet for carbon dioxide. This inlet is then connected to a suitable source of carbon dioxide at the required pressure. This then enables the product to be kept in a carbonated condition, ready for dispensing. It has been found that the fermentation vessel can take moderate pressures above atmospheric pressure, e.g. pressures such as 8 psi. The shape of the curved portion 14 assists when the container 2 is pressurized. The curved portion 14 prevents the base doming outwards, as is common for flat bottom containers.

The vessel 1 can include other features, such as a shallow recess 80, for a label or the like.

Whilst the vessel 1 is intended for a single stage fermentation, it can still be used in other fermentation methods, where the fermented product is transferred to another vessel. In particular, the finished product can be transferred to bottles, for storage.

The material of the vessel 1 can have a variety of finishes. It can be either transparent or translucent. Further, it could be "touch clear". Such a material is translucent until wetted on one side, when it becomes transparent. The plastic used can also be given a colour tint. This can either be uniform, or it can deliberately be nonuniform or streaked to give a marble finish. Thus, polypropylene could be streaked with a blue colour. For polyethylene, it has been found more effective to use a brown colour.

I claim:

1. A unitary, molded fermentation vessel comprising: a container for receiving liquid, and including a neck portion at its upper end; and a closure member, which includes an air lock means and a connection portion continuous with the neck portion, and which closure member is removable in use, the closure member being adapted, in use, after separation from the connection portion, for forming a seal with the neck portion.

2. A fermentation vessel as claimed in claim 1, wherein the neck portion includes an annular groove, open radially outwards, for receiving an O-ring.

3. A fermentation vessel as claimed in claim 2, wherein the closure member includes a generally cylindrical closure surface, adapted for engaging an O-ring seated in said groove.

4. A fermentation vessel as claimed in claim 2 or 3, wherein the neck portion includes a threaded part adjacent its free end, with the groove for the O-ring below the threaded part, the threaded part and said groove being dimensioned such that the threaded part does not interfere with the engagement of the closure member and an O-ring in said groove.

5. A fermentation vessel as claimed in claim 3, wherein the closure member comprises a generally cylindrical body portion, which has a shallow conical top surface, and a short cylindrical part which is inset radially from a remainder of the body portion, to define said generally cylindrical closure surface.

6. A fermentation vessel as claimed in claim 5, wherein said short cylindrical part is joined to adjacent parts of the cylindrical body portion by frustro-conical parts, so that the generally cylindrical body portion has a trapezoidal cross-section.

7. A fermentation vessel as claimed in claim 5 or 6, wherein the connection portion comprises a frustro-conical part extending radially inwards from the closure member to the neck portion.

8. A fermentation vessel as claimed in claim 5 or 6, wherein the air lock means comprises a U-shape duct, which opens into the cylindrical body portion adjacent the top surface thereof, and includes web sections extending between sides of the U-shape duct and between the U-shape duct and the body portion of the closure member.

9. A fermentation vessel as claimed in claim 5 or 6, wherein the air lock means comprises a U-shape duct one side limb of which is continuous with the body portion and opens into the body portion adjacent the top surface thereof, and the other side limb of which includes a substantially spherical enlargement adjacent its free, upper end.

10. A fermentation vessel as claimed in claim 3, wherein the container is generally cylindrical, and includes a flat base.

11. A fermentation vessel as claimed in claim 10, wherein the base of the container comprises two coplanar flat parts, and a curved part extending from one side of the container to the other between the flat parts.

12. A fermentation vessel as claimed in claim 10, 11, wherein the container includes a shallow, annular recess for receiving a heating belt.

13. A fermentation vessel as claimed in claim 10 or 11, which includes recesses on either side thereof, forming handle apertures enabling the vessel to be lifted.

14. A fermentation vessel as claimed in claim 10 or 11, which includes a threaded socket near the base thereof for a tap.

15. A fermentation vessel as claimed in claim 10 or 11, which includes a shallow recess, for a label.

16. A unitary blow-molded fermentation vessel comprising: a cylindrical container for receiving liquid, and including a flat base, a shallow recess around the container for a heating belt, a socket for a tap, and a neck portion at an upper end thereof, which neck portion is generally circular, and includes an annular groove, open radially outwards, for an O-ring, and a threaded part above said annular groove; and a closure member which comprises a cylindrical body portion that defines a radially inset closure surface, adapted for sealing with an O-ring in said annular groove, a connection portion that is generally frustro-conical and extends radially inwards from the body portion to the neck portion of the container, and an air lock comprising a U-shape duct that extends from an upper end of the body portion.

17. A fermentation vessel as claimed in claim 1, in which the closure member is separate from the container, and the connection portion is removed from the closure member, and which includes an O-ring mounted in said groove.

18. A fermentation vessel as claimed in claim 2 or 3, wherein the neck portion includes a threaded part above the groove, the closure member is separate from the container, and the connection portion is removed from the closure member, and wherein the fermentation vessel includes an O-ring fitted in said groove, and a screw cap which can engage the threaded part of the neck portion.

* * * * *